United States Patent [19]

Dimos et al.

[11] Patent Number: 5,596,600
[45] Date of Patent: Jan. 21, 1997

[54] STANDALONE CANCELLER OF NARROW BAND INTERFERENCE FOR SPREAD SPECTRUM RECEIVERS

[75] Inventors: George Dimos, Cambridge; Triveni N. Upadhyay, Concord, both of Mass.

[73] Assignee: Mayflower Communications Company, Inc., Billerica, Mass.

[21] Appl. No.: 417,619

[22] Filed: Apr. 6, 1995

[51] Int. Cl.⁶ .................................................. H04B 15/00
[52] U.S. Cl. ........................ 375/206; 370/208; 375/346; 380/9
[58] Field of Search .................................. 375/201, 200, 375/206, 229, 230, 232, 233, 324, 340, 343, 346; 380/9, 13, 34; 327/164; 364/717, 724.16, 724.13; 333/166; 370/19, 21, 26; 455/308

[56] References Cited

U.S. PATENT DOCUMENTS

| | | | |
|---|---|---|---|
| 4,112,372 | 9/1978 | Holmes et al. | 375/343 |
| 4,271,525 | 6/1981 | Watanabe | 375/232 |
| 4,591,669 | 5/1986 | Duttweiler et al. | 370/26 |
| 4,613,978 | 9/1986 | Kurth et al. | 375/346 |
| 4,670,885 | 6/1987 | Parl et al. | 375/200 |
| 5,043,814 | 8/1991 | Lish | 348/614 |
| 5,048,052 | 9/1991 | Hamatsu et al. | 375/200 |
| 5,050,119 | 9/1991 | Lish | 364/724.16 |
| 5,132,985 | 7/1992 | Hashimoto et al. | 375/200 |
| 5,181,225 | 1/1993 | Neeser et al. | 375/350 |
| 5,185,762 | 2/1993 | Schilling | 375/205 |
| 5,241,561 | 8/1993 | Barnard | 375/206 |
| 5,268,927 | 12/1993 | Dimos et al. | 375/206 |
| 5,414,699 | 5/1995 | Lee | 370/18 |
| 5,467,368 | 11/1995 | Takeuchi et al. | 375/206 |

*Primary Examiner*—Wellington Chin
*Assistant Examiner*—William Luther
*Attorney, Agent, or Firm*—Henry D. Pahl, Jr.

[57] ABSTRACT

A spread spectrum interference canceller includes a downconverter for amplifying and translating the received signal from the radio frequency band to baseband, said signal comprising multiple direct sequence-spread spectrum signals and multiple narrowband interferers; a digital adaptive transversal filter for processing the downconverter output signal to suppress the narrowband interferers, and for regulating the amplitude of the resulting signal; an upconverter for translating the filter output from baseband to the radio frequency band, so that the resulting interference canceller output can be processed by a spread spectrum receiver.

10 Claims, 7 Drawing Sheets

STANDALONE CANCELLER OF NARROW BAND INTERFERENCE FOR SPREAD SPECTRUM RECEIVERS

BACKGROUND OF THE INVENTION

This invention relates generally to radio receiving apparatus for processing spread spectrum signals contaminated by narrowband interference, and in particular, to direct sequence/spread spectrum systems in which each data bit is mapped into a pseudorandom noise sequence of binary pulses (chips).

Spread spectrum signals are used in digital radio systems for telecommunication and navigation purposes. In navigation systems (Global Positioning System (GPS), GLONASS, GPS/GLONASS), a receiver processes several spread spectrum signals, each one emitted by a different satellite, to track the distance of the receiver from each satellite, and thereby, to determine its own position. In telecommunication systems, spread spectrum signals are used for (i) combating interference, (ii) transmitting at very low power to avoid detection/interception, and (iii) multiplexing one channel over many users.

Spread spectrum signal processing is characterized by expanding the bandwidth of the transmitted signal by a large factor (typically higher than 100) through pseudorandom noise (PN) modulation, and by compressing the bandwidth of the received signal by the same factor. PN modulation is implemented by two techniques: (i) by transmitting a PN sequence of binary pulses in each data bit interval, which is referred to as direct sequence/spread spectrum (DS/SS) system, and (ii) by employing different carrier frequencies in each data bit interval (or fraction thereof) so that the record of used carrier frequencies constitutes a PN sequence, which is referred to as a frequency hopped/spread spectrum (FH/SS) system. In both methods bandwidth compression is accomplished by correlating the received signal with the known PN chip or carrier frequency sequence. Due to spread spectrum signal processing, every incident interference is spread at the receiver over the whole system bandwidth, whereas the bandwidth of the desired signal is compressed. As a result, the effective interference power is smaller than the total incident interference power by a factor equal to the bandwidth expansion factor. For the above reason, the bandwidth expansion factor is referred to as the processing gain of the spread spectrum system.

In a DS/SS receiver it is possible to suppress a narrowband interferer beyond the processing gain, by filtering the received signal prior to despreading through an adaptive transversal filter (ATF). An ATF estimates the interference component in a reference input sample $X_i$ through an optimal linear combination $\hat{X}_i = (W_N X_{i-N} + \ldots + W_1 X_{i-1}) + (W_{-1} X_{i+1} + \ldots + W_{-N} X_{i+N})$ of N delayed input samples $(X_{i-1}, \ldots, X_{i-N})$ and N advanced input samples $(X_{i+1}, \ldots, X_{i+N})$, which are typically spaced one-chip interval apart. Interference is suppressed by subtracting the estimate $\hat{X}_i$ from the reference $X_i$ and the difference $Y_i$ is the ATF output, i.e., $Y_i = X_i - \hat{X}_i$. If the interference is estimated from delayed input samples only (i.e., as in prediction filtering), the ATF is referred to as a one-sided ATF. If advanced input samples, as well as delayed input samples, are used (i.e., as in interpolation filtering) then the ATF is referred to as a two-sided ATF.

Besides suppressing interference, the above filtering increases the thermal noise and distorts the PN-code in ATF output Y. The ATF gain corresponds to the net benefit of interference suppression minus the signal-to-noise ratio (SNR) losses due to excess thermal noise and PN-code distortion. The ATF gain increases as the PN-code components of the combined samples become less correlated and the interference components become more correlated. Since the correlation between consecutive signal samples increases as the signal power spectrum gets narrower, significant ATF gain is expected when the interference spectrum occupies a small fraction, typically less than 10%, of the PN-code bandwidth. In the frequency domain, the operation of ATF corresponds to discriminating against the interference spectrum by forming a linear filter (through the appropriate weights $W_k$) with a notch around the center frequency of the interferer. Accordingly, ATF is not very effective against wideband interference, but it is very effective against continuous-wave (CW) interference and other narrowband interferences, such as pulsed CW, swept CW, and narrowband noise (AM or FM).

Assuming that the interference has an adequately narrowband spectrum for ATF application, there are two critical system requirements for achieving significant ATF gain. First, there must be adequate means for filtering and, secondly, there must be adequate means for generating automatically appropriate weights. Regarding the filtering aspect thereof, the ATF must be capable of combining a minimum number of input samples to estimate interference. If the interference forms K well-separated spectral bands, the minimum number of taps is 2K because the ATF needs to introduce at least one spectral notch at each interference band, at the expense of two taps (i.e., real weight coefficients) per notch. Regarding automatic weight generation, the optimal weights depend on the interference characteristics and on the criterion of optimality or cost function. An effective cost function for spread spectrum systems subjected to strong interference is the average power of the ATF output signal Y. Classical mean square error theory shows that the optimal weights can be obtained by solving a set of 2N linear equations (normal equations), which involve the correlation function of the ATF input signal. A practical iterative algorithm, which has been shown to converge (on the average) to the optimal weights, is the Widrow-Hoff algorithm. This algorithm updates $W_k$ as: $W_k = \text{OLD}(W_k) + u \cdot X_{i-k} \cdot Y_i$. The parameter (u) is referred to as the step-size (of the algorithm), and it controls the convergence characteristics and the steady-state weight jitter of the algorithm. It has been determined, through ATF simulations in multiple CW interference, that the typical value of u=0.01 is a good compromise between convergence rate and steady-state jitter.

Although the theoretical principles of adaptive transversal filtering were introduced almost 30 years ago, it is desirable to develop better filtering techniques so as to reduce the cost and improve the performance thereof, as well as to expand the use thereof into many new applications. In a previous invention (5,268,927, December 1993, Dimos, et. al.), the applicants proposed a digital ATF which could be incorporated in a spread spectrum receiver, and which could achieve a high level of suppression of narrowband interference by proper design of signal regulation, signal resolution, and prevention of ATF weight drifting. Although integration of a digital ATF in a spread spectrum receiver is the most efficient approach for interference suppression for new receiver designs, this is not necessarily true for existing receiver designs. In particular, regarding safety-critical equipment (for example, GPS receivers for aircraft navigation), the cost of redesigning and recertifying that equipment is very high. It is therefore very desirable to perform interference suppression through the digital ATF without having to modify an existing receiver.

SUMMARY OF THE INVENTION

The present invention addresses issues relating to the implementation of a low-cost interference canceller to suppress narrowband interference in DS/SS systems by using a digital ATF but without requiring modifications in the receiver. Low-cost interference suppression through a digital ATF requires that the spread spectrum signals get translated from the radio frequency (RF) band to baseband for ATF processing. Compatibility with the spread spectrum receiver requires that the filtered spread spectrum signals get translated from baseband back to RF. In general, the downconversion and upconversion of the spread spectrum signals can cause significant distortions regarding image frequencies, amplitude transients, and excess thermal noise. The present invention provides innovative solutions to the following technical problems related to the implementation of the interference canceller:

1. Image frequency distortion, wherein the invention selects the baseband intermediate frequency (IF) of the interference canceller so that image frequencies can be rejected at the spread spectrum receiver, without requiring receiver modifications.

2. Loss of signal resolution due to ATF output variations, wherein the invention provides multi-bit digital-to-analog conversion and a low-cost digital amplitude regulator.

3. Excess thermal noise due to the superposition of interference canceller noise and receiver noise, wherein the invention regulates the power of the signal provided to the receiver to effectively cancel the receiver noise.

In summary, the invention has the following objectives:

It is an object of the invention to provide a low-cost implementation of an interference canceller to suppress any narrowband interference in direct sequence spread spectrum signals received from an antenna by employing a digital ATF, and without requiring any additional signals external to the unit.

It is another object of the invention to provide the filtered spread spectrum signals, in which the interference has been suppressed, to a receiver without requiring that any modifications be made to that receiver.

It is another object of the invention to ensure that any generated image frequencies in the interference canceller will be rejected by the receiver without requiring that any modifications be made to that receiver.

It is another object of the invention to minimize signal losses in the receiver due to signal power variations and loss of resolution in the interference canceller.

It is another object of the invention to minimize excess noise in the receiver due to the superposition of the noise generated in the interference canceller and the noise generated in the receiver.

These and other objects are accomplished in accordance with the illustrated preferred embodiment of the present invention by providing an interference canceller module, which receives the spread spectrum signals and any incident interference from an antenna, processes the received signal to suppress the narrowband components of the interference through a digital ATF and delivers the processed signals to a spread spectrum receiver at the same carrier frequency at which they were received and at a regulated power level. The interference canceller module comprises a downconverter, a digital ATF, an upconverter and a synthesizer.

The downconverter translates the frequency of the signal received from the antenna from the RF band to a baseband intermediate frequency, and it amplifies the signal by a variable amplification gain in order to regulate the power of the resulting analog baseband signal. The ATF converts the analog baseband input signal to a digital input signal. The ATF subsequently filters the digital input signal by a finite impulse response filter, thereby generating a digital output signal in which the interference is suppressed. The ATF generates the digital filter weights in a recursive fashion, by updating the previous weights through the product of reduced resolution versions of the digital input signal and the digital output signal. The ATF subsequently regulates the amplitude of the digital output signal and converts it to an analog baseband output signal. The upconverter translates the frequency of the analog baseband output signal to the same carrier as in the RF input, it attenuates the power of the baseband output signal by a fixed attenuation factor, and it provides the resulting RF output signal to the spread spectrum receiver. The synthesizer generates the local carriers used for frequency translation in the downconverter and in the upconverter, and the sampling clock used for the operation of the ATF.

DESCRIPTION OF THE PREFERRED EMBODIMENTS

The invention can be described in more detail with the help of the accompanying drawings, wherein.

DESCRIPTION OF PREFERRED EMBODIMENT

The present invention is directed to an apparatus and method for processing spread spectrum signals outside the receiver to suppress any incident narrowband interference through a digital ATF, and for providing to the receiver the resulting signals at an RF carrier frequency equal to the carrier frequency of the received signals. Referring to the block diagram of FIG. 1, said apparatus comprises the interference canceller 1 accepting the RF input signal S from the antenna 2 and providing the RF output signal $\tilde{S}$ to the receiver 3. The signal S at the RF input of the interference canceller consists of multiple PN-code waveforms, translated to some common RF carrier frequency, plus interference, and, if an antenna preamplifier exists, thermal noise. The interference canceller 1 downconverts the RF signal S to the baseband input signal X through the downconverter 30, processes X through a digital ATF 10 to suppress any narrowband interference resulting in the filtered baseband output signal Y, and translates Y back to the signal $\tilde{S}$ through the upconverter 40. The filtered RF output signal $\tilde{S}$ has a reduced amount of interference compared to S, and it can be processed by the spread spectrum receiver 3 without any receiver modifications. In addition, the digital ATF outputs a one-bit display signal INTERF, indicating presence of interference. The synthesizer 50 generates the local oscillator waveforms L01 and L02, which are provided to the RF and IF mixers, respectively, of the downconverter and upconverter, as well as the sampling clock FS, which is provided to the digital ATF.

Figure 1:
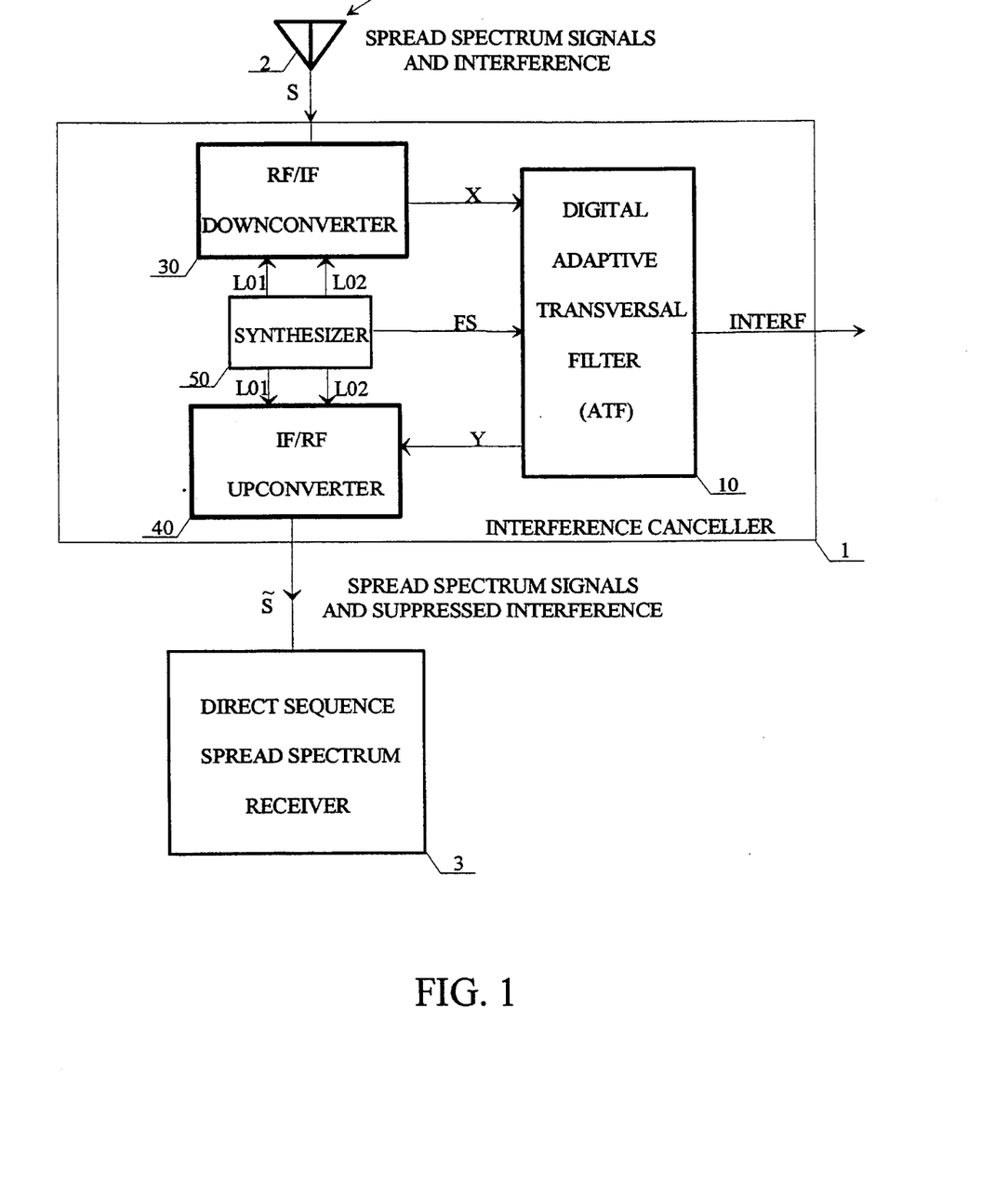
FIG. 1 is a block diagram of the interference canceller in accordance with a preferred embodiment of the invention.

The signal $\tilde{S}$ at the RF output of the interference canceller consists of multiple PN waveforms translated to the same RF carrier frequency as the frequency of the RF input signal, residual interference, and thermal noise and PN-code distortions. The thermal noise distortion of the output signal $\tilde{S}$ originates mostly in the initial amplifier of the downconverter or in the antenna preamplifier, and it is amplified through the ATF processing by about 1 dB. The PN-code distortion component of the output signal $\tilde{S}$ is due to the ATF processing as well as to the upconverter filtering. The distortion induced by the ATF consists of a weighted sum of PN-code signals, which are time-shifted versions of the original PN-code signal. This results in the creation of time-shifted and attenuated versions of the PN-code correlation. The distortion induced by the upconverter consists of a PN-code signal image separated in frequency by $2 \cdot f_I$ from the original PN-code signal, in which $f_I$ denotes the baseband intermediate frequency (IF) of the downconverter output X. The net processing gain of the interference canceller consists of the signal-to-noise ratio (SNR) improvement in the receiver which is due to interference suppression, minus the SNR loss due to excess thermal noise, image frequency distortion, and PN-code distortion.

Figure 2:
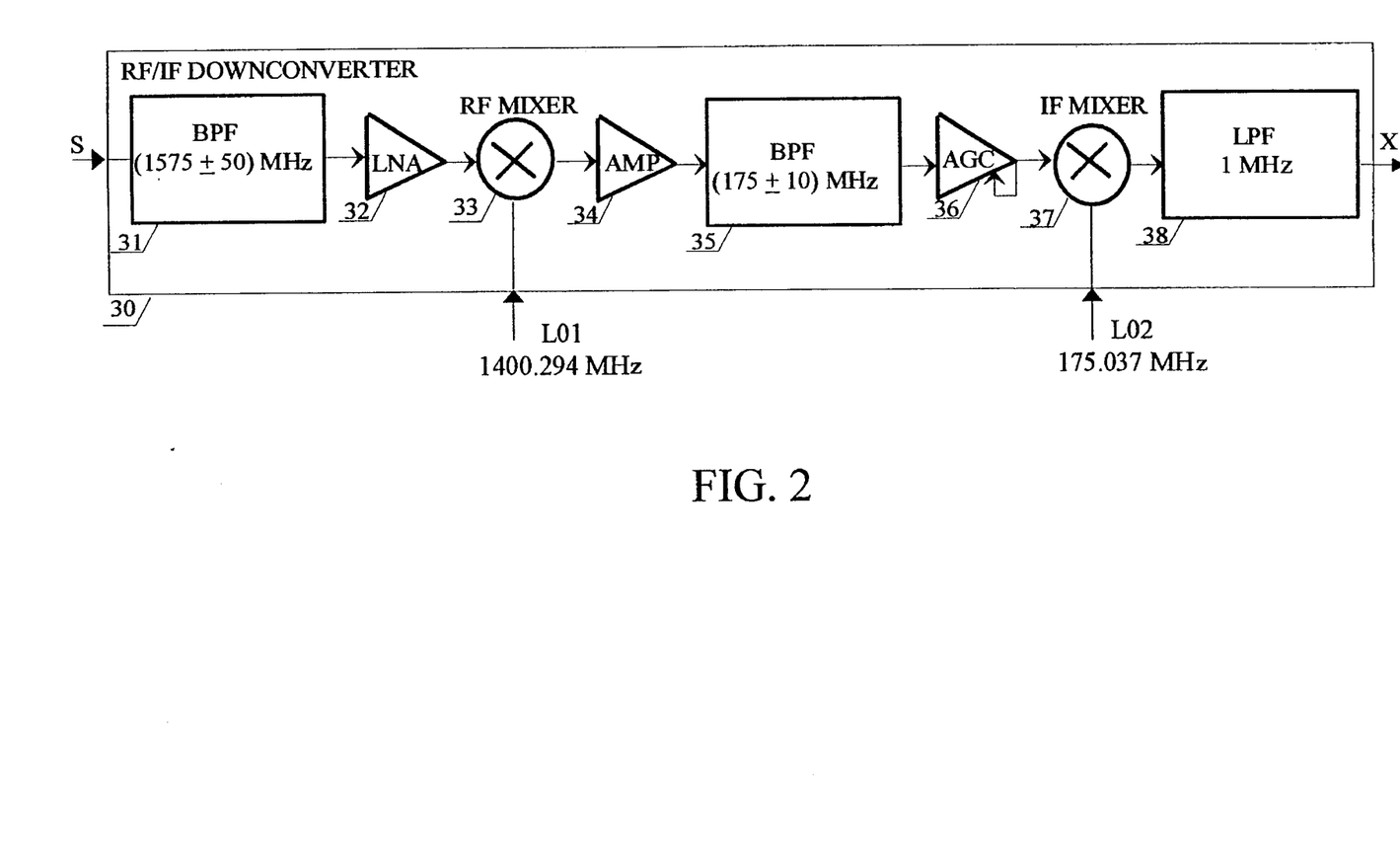
FIG. 2 is a block diagram of the RF/IF downconverter of the interference canceller of FIG. 1.

A block diagram of the RF/IF downconverter 30 is shown in FIG. 2 for a C/A code GPS receiver application, in which the RF input S is received at the L1 frequency $f_{L1}$=1575.42 MHz and it has a chip rate of 1.023 MHz (the same block diagram applies for P-Code receivers, in which the chip rate is 10.23 MHz, and for L2 frequency receivers, in which $f_{L2}$=1227.60 MHz, by changing the filter bandwidths and the local carrier frequencies). The signal S is filtered by the first bandpass filter (BPF) 31 at L1 and in a bandwidth of 50 MHz, in order to limit distortions due to out-of-band emissions. The signal is subsequently amplified by the low-noise amplifier (LNA) 32. A suitable LNA is the Triquint TQ9121N amplifier. To minimize thermal noise distortions, the noise figure of the LNA should be no higher than the noise figure of the receiver, which is typically 3 dB. The signal is subsequently downconverted to 175.126 MHz through mixing with the first local carrier L01 (at 1400.294 MHz) at the RF mixer 33, amplification at the IF amplifier 34, and filtering at the 10 MHz band pass filter (BPF)35. The signal is subsequently regulated in amplitude through the automatic gain control (AGC) circuit 36, so that the amplitude of the signal delivered to the digital ATF 10 stays almost constant as the in-band RF interference power increases from −110 dBm to −80 dBm. A suitable AGC circuit consists of the Triquint TQ9114 amplifier controlled by the Watkins Johnson W5-D3 power detector. The signal is subsequently downconverted to the final baseband IF of 90 kHz through mixing with the second local carrier L02 (at 175.037 MHz) at the IF mixer 37, and filtering by the low-pass filter (LPF) 38 which has a system bandwidth B Hz equal to the chip rate (B=1 MHz). We have determined that the fixed power gain of the downconverter is about 80 dB, for analog-to-digital (A/D) conversion at 1 mW and 30 dB gain control at the AGC 36. We have determined that IF must be less than 10 percent of the system bandwidth B in order to minimize the frequency band of incident RF interference. It is known that IF must be higher than the maximum expected Doppler frequency $F_D$ in the PN-code waveforms, which results from the relative motion of the receiver and the GPS satellites, and which typically is $F_D$=5 kHz for GPS. The selected $f_I$=90 kHz for the embodiment of the invention satisfies both of the above system requirements.

Figure 3:
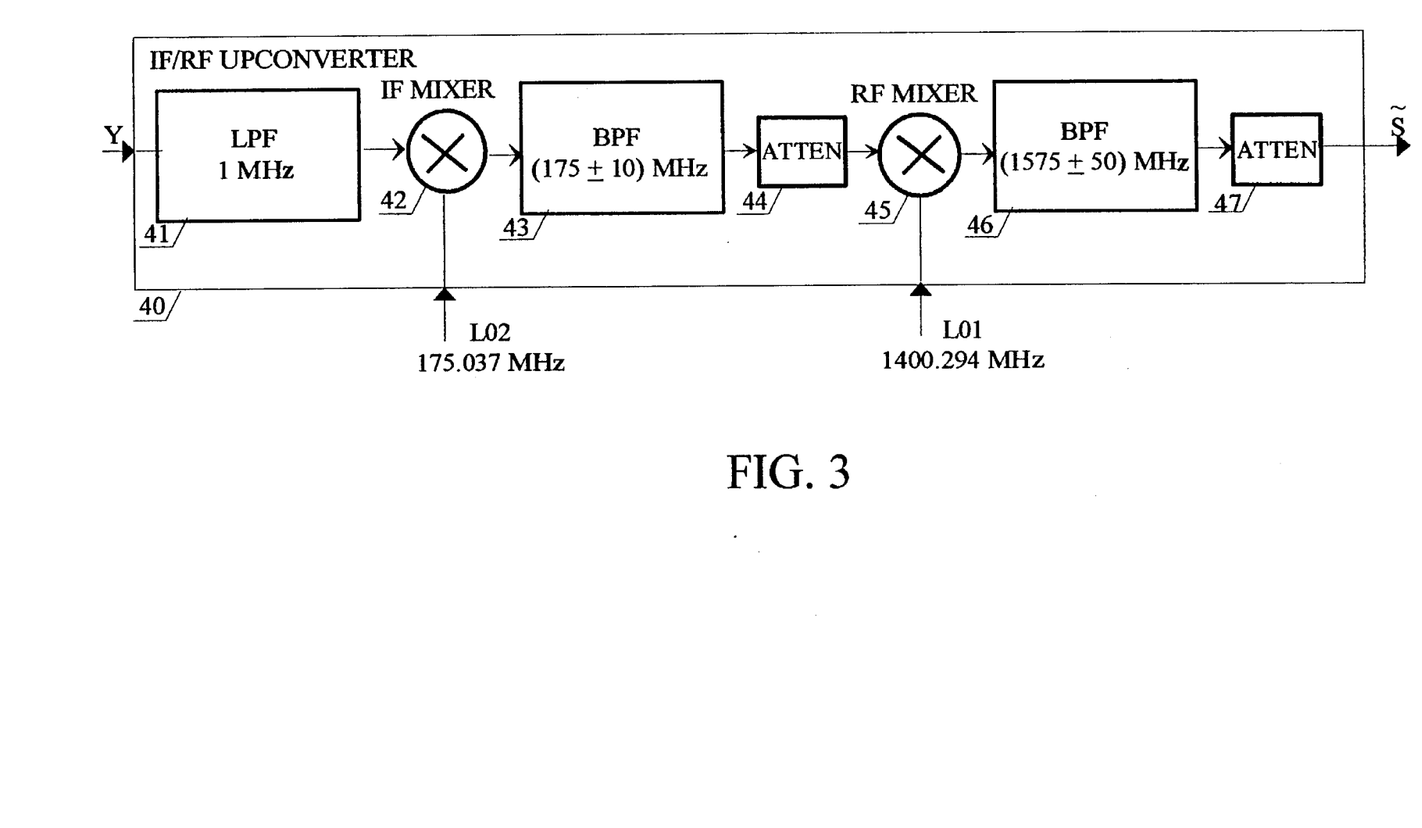
FIG. 3 is a block diagram of the IF/RF upconverter of the interference canceller of FIG. 1.

The output of the downconverter is the analog baseband signal X consisting of multiple PN-code waveforms translated to IF, incident RF interference in the frequency band $f_{L1}$±B, translated to IF, and thermal noise. The digital ATF 10 processes the signal X to suppress the interference and generates the analog baseband signal Y. The upconverter 40 receives the signal Y and generates the RF output signal $\tilde{S}$ which has the proper carrier frequency and power for processing in the spread spectrum receiver 3, as shown in FIG. 1. FIG. 3 shows a block diagram of the upconverter for the preferred embodiment of the invention. The signal Y is filtered by LPF 41 in a bandwidth of B Hz, in order to reject any high-frequency distortions induced by the A/D conversion in the digital ATF. The signal is subsequently translated to 175.126 MHz through mixing with the local carrier L02 (at 175.037 MHz) in the IF mixer 42, and filtering by BPF 43 in a bandwidth of 10 MHz. The signal is subsequently attenuated at the IF attenuator 44, and translated to $f_{L1}$ through mixing with the local carrier L01 (at 1400.294 MHz) in the RF mixer 45, and filtering by the BPF 46 in a bandwidth of 50 MHz. The signal is finally, attenuated by the RF attenuator 47 to generate the RF output $\tilde{S}$ at a power level of no less that 10 dB above the power of the in-band signal at the receiver input under interference-free conditions (i.e., above −100 dBm for the preferred embodiment). Consequently, the thermal noise of the receiver does not cause additional SNR loss.

The IF mixer 42 of the upconverter introduces an image of a certain PN-code waveform at a frequency $2 \cdot (f_I + f_D)$ below the primary L1-frequency, in which $f_D$ is the instantaneous Doppler frequency of the tracking channel corresponding to the particular PN-code. For example, for the selected IF $f_I$=90 kHz for the preferred embodiment of the invention, and for a Doppler frequency $f_D$=1.5 kHz at a particular tracking channel, the upconverter output $\tilde{S}$ will divide the corresponding signal power equally between the primary L1-frequency $(f_{L1}+f_D)$=(1575.42+0.0015) MHz and the image L1-frequency $(f_{L1}-2 \cdot f_I - f_D)$=(1575.42−0.1815) MHz. The IF image cannot be simply filtered out because the intermediate frequency is much smaller than the system bandwidth ($f_I$<<B), which renders the separation of the primary IF signal from the image IF signal impossible prior to signal despreading in the receiver. The receiver can reject the IF image distortion, without requiring any software modifications, if the receiver IF $f'_I$ differs from the interference canceller IF $f_I$ by more than $2 \cdot F_D$, $F_D$ denoting the maximum expected Doppler frequency ($F_D \approx 5$ kHz for typical GPS receivers). In the above case, we have SNR loss of 3 dB. In principle, if $f_I = f'_I$, the spectra of a primary PN-code waveform and its IF image will coincide perfectly in the receiver, so that no SNR loss will be incurred. In practice, it is not feasible to match exactly the IFs of the receiver and the interference canceller. We have determined that in order to (i) avoid tracking distortions without any receiver modifications, and (ii) keep the cost of the interference canceller low, we must select the interference canceller IF to differ from the receiver IF by $2 \cdot F_D$. An alternate approach, which avoids SNR loss at the expense of increased complexity, is to employ quadrature IF processing. In this case, the downconverter IF mixer 37 must be replaced by a quadrature mixer, the upconverter IF mixer 42 must be replaced by a quadrature modulator, and the circuits of the digital ATF must be duplicated to accommodate the in-phase and quadrature IF signals. Suitable quadrature devices are the Synergy QMS-207 mixer and the Synergy SMR-206 modulator.

Figure 4:
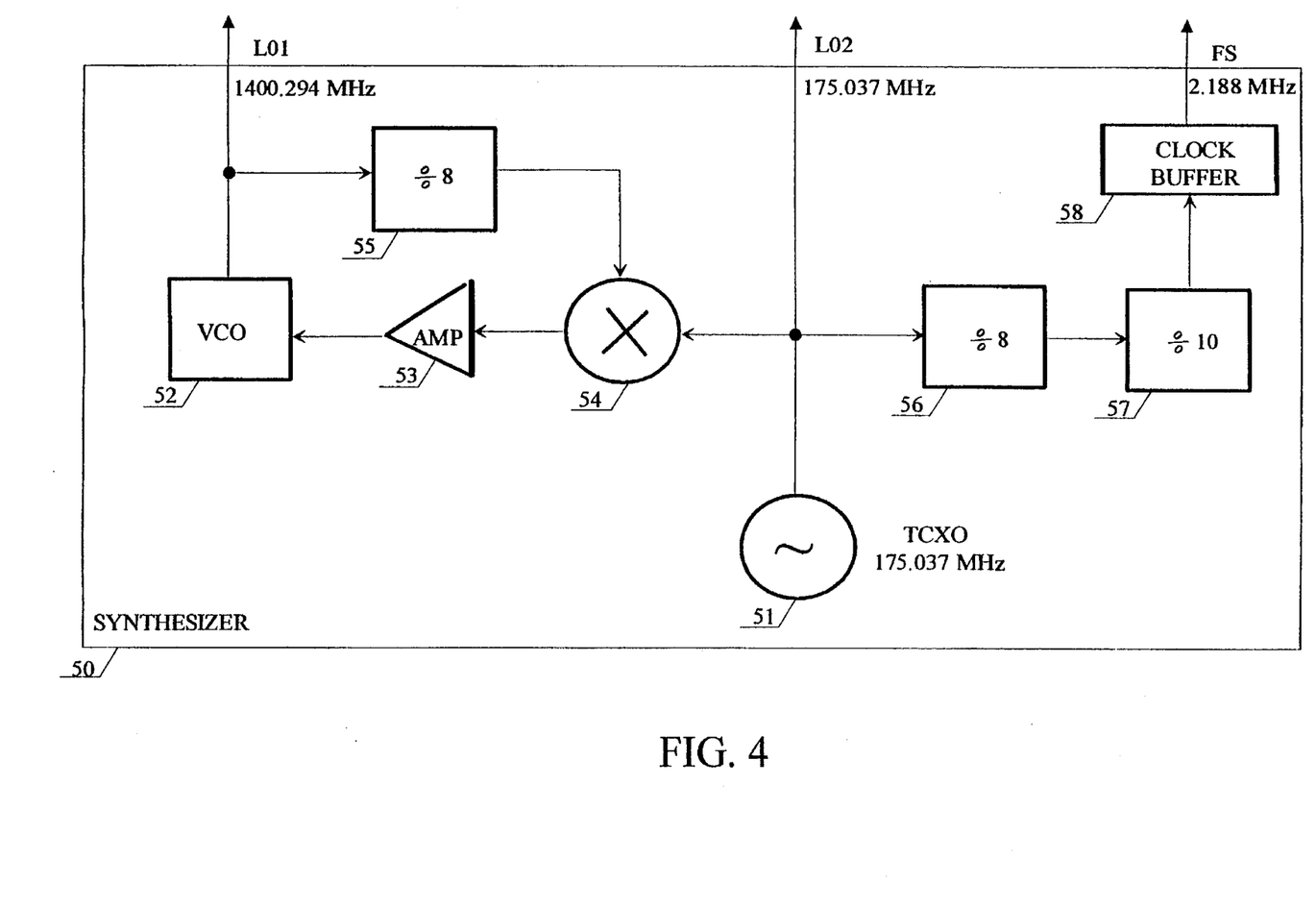
FIG. 4 is a block diagram of the synthesizer of the interference canceller of FIG. 1.

FIG. 4 shows a block diagram of the frequency synthesizer 50, which generates the local carriers L01 and L02 provided to the downconverter and the upconverter, as well as the sampling clock FS provided to the digital ATF. The synthesizer employs a thermally controlled crystal oscillator (TCXO) 51, which provides directly the L02 carrier. The L01 carrier is generated coherently from TCXO by frequency multiplication through a phase-locked loop (PLL). PLL consists of the IF mixer 54, amplifier/filter 53, voltage controlled oscillator (VCO) 52, and the frequency divider 55. A suitable PLL device is the VARI-L PLL200-1400. The principle of operation is that VCO receives maximum power input when it generates the carrier which after (1/a) frequency division matches the TCXO carrier. As a result, the frequency $f_1$ of the L01 carrier at the VCO output relates to the frequency $f_2$ of the L02 carrier at the TCXO output as $f_1 = a \cdot f_2$. For a certain frequency multiplication factor (a) and RF frequency $f_{L1}$, the TCXO frequency $f_2$ and the IF of the canceller $f_I$ are related as: $f_I = F_{L1} - (a+1) \cdot f_2$. The sampling clock FS is generated coherently from the TCXO, by (1/b) frequency division and buffering/amplification in the buffer 58 for carrier-to-clock conversion. In a preferred embodiment of the invention we have $f_{L1} = 1575.42$ MHz, $f_I = 90$ kHz, and we use 3-bit frequency divider for a=8, resulting in the TCXO frequency $f_2 = 175.037$ MHz. For the clock FS, we use cascaded (1/8) and (1/10) frequency dividers for b=80, resulting in the sampling frequency $f_S = 2.188$ MHz.

Figure 5:
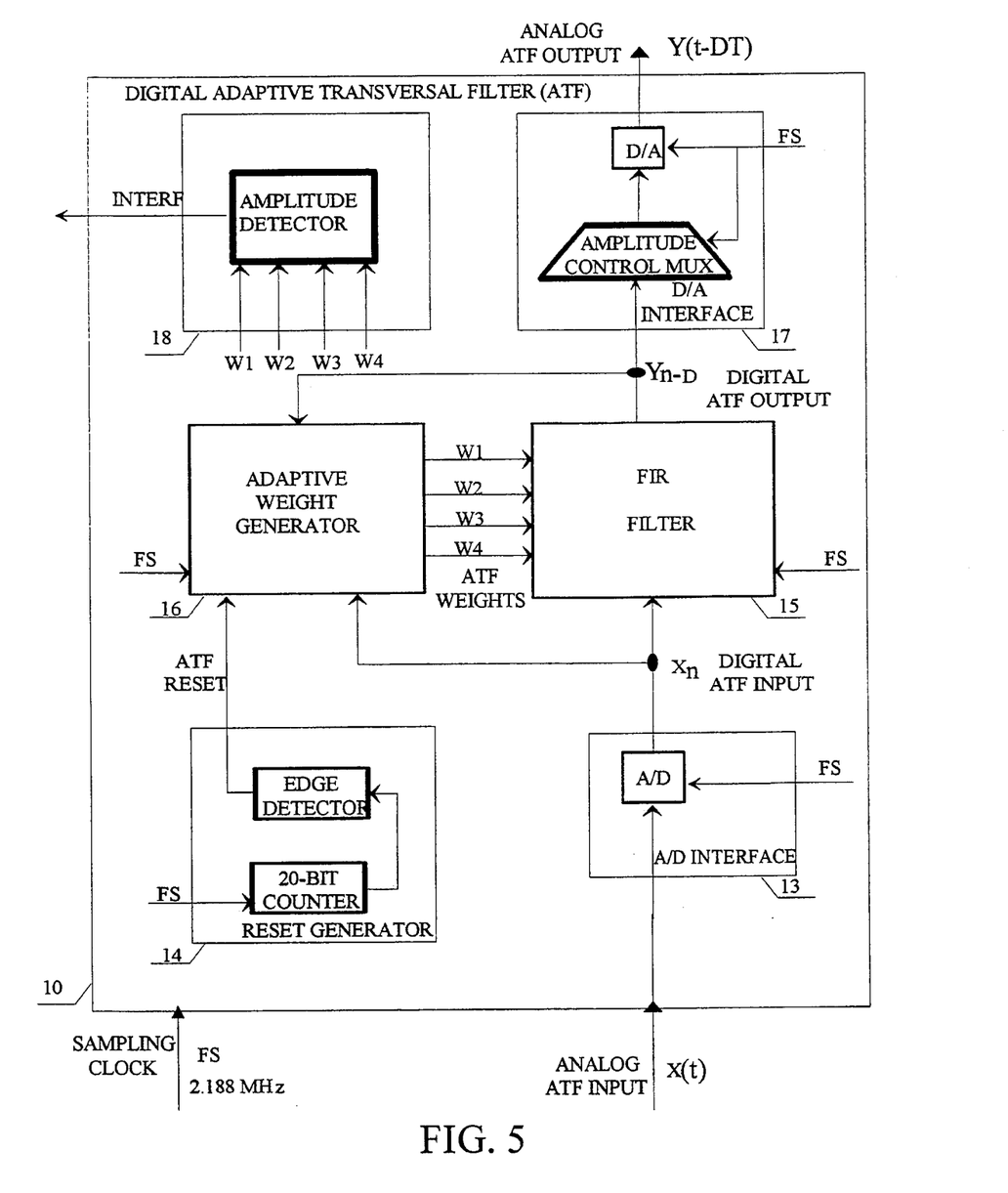
FIG. 5 is a block diagram of the digital ATF of the interference canceller of FIG. 1.

FIG. 5 shows the major modules of the digital ATF 10, which suppresses the interference in the analog baseband input signal X(t) received from the downconverter and thereby generates the analog baseband output signal Y(t) delivered to the upconverter. As shown therein, the signal X(t) is processed first by the A/D interface module 13 for digitization. Within the power-control range of the downconverter AGC, the delivered signal X to the A/D converter occupies one quarter of the amplitude range of the A/D converter. This leaves a margin of 12 dB of interference power before the performance of the digital ATF will be affected due to clipping of the input signal. For example, the preferred embodiment employs 10-bit A/D converter generating a digital input signal $X_n$ with an effective resolution of 8 bits as long as the RF interference is less than −80 dBm. As the RF interference increases from −80 dBm to −68 dBm the resolution of the $X_n$ increases from 8 bits to 10 bits; if the RF interference exceeds −68 dBm, $X_n$ is a clipped version of X(t) resulting in loss of interference suppression. A suitable A/D converter is the Analog Devices AD773.

The digitized input signal samples $X_n$ are delivered to the finite impulse response (FIR) filter section 15 at the sampling rate $f_S = 2.188$ MHz of the clock FS, in order to suppress interference with minimal distortion of the PN-code waveforms. In addition to $X_n$, the FIR filter 15 receives a set of ATF weights $W_1$, $W_2$, $W_3$, $W_4$ from the weight generator 16, which determines how successfully the interference is suppressed. The FIR filter generates the output signal $Y_n$, which is fed back to the weight generator so that the weights are modified to minimize the power of $Y_n$.

Figure 6:
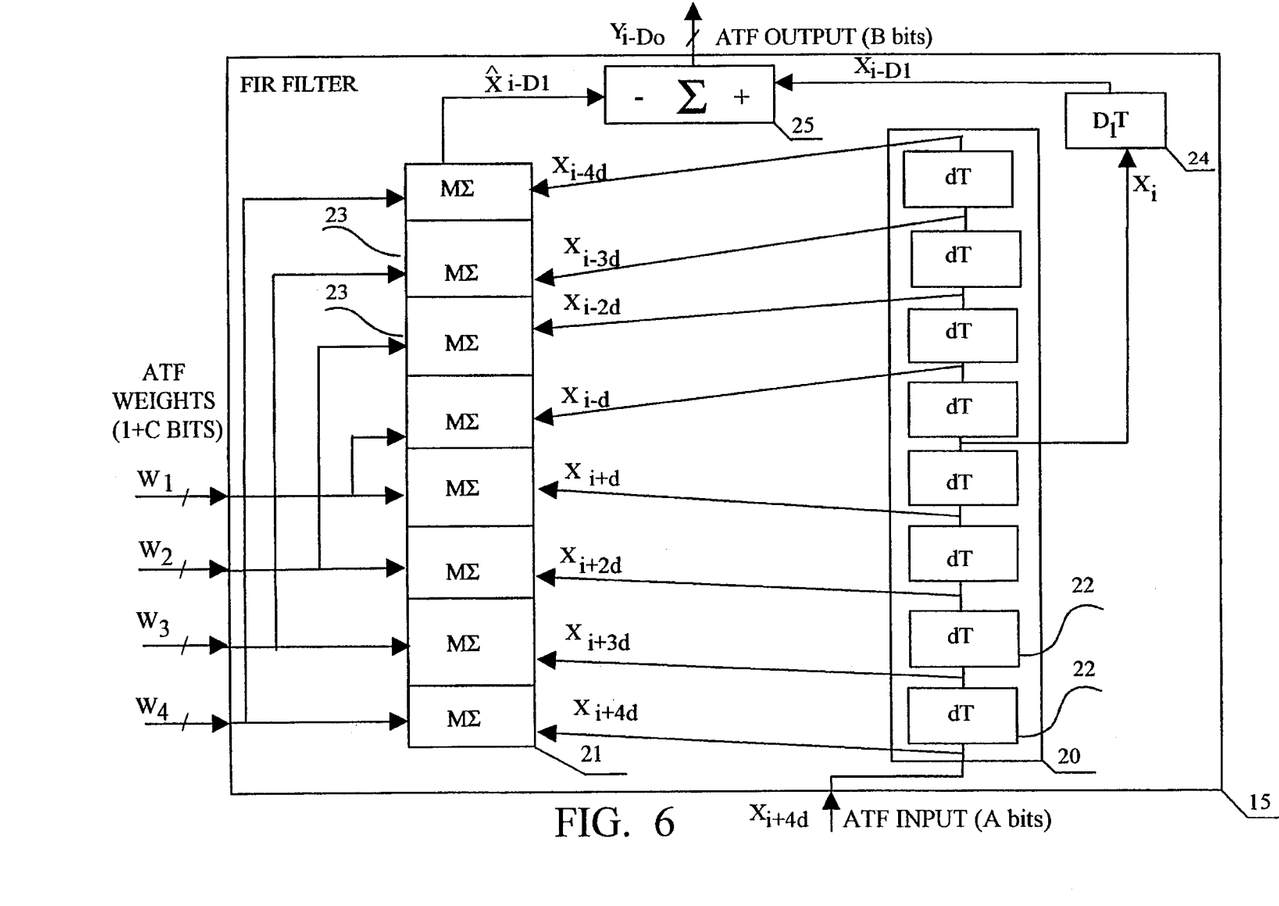
FIG. 6 is a block diagram of the FIR filter of the digital ATF of FIG. 5.

The detailed implementation of the FIR filter is shown in FIG. 6. The digital input signal $X_n = X_{i+4d}$ enters a tapped-delay line (TDL) 20, which in the embodiment shown has eight tapped delays 22, the center tap providing the present sample $X_i$, the first four side-taps providing the advanced samples $X_{i+d}$, $X_{i+2d}$, $X_{i+3d}$, $X_{i+4d}$ and the last four side-taps providing the delayed samples $X_{i-d}$, $X_{i-2d}$, $X_{i-3d}$, $X_{i-4d}$. The parameter (d) refers to the delay (in integer number of sampling intervals) between adjacent taps. In the implementation shown, adjacent TDL outputs are spaced two sampling intervals apart (i.e., d=2), which, for the intended GPS C/A-code receiver application corresponds to 94% of the chip interval. This ensures that there is minimal correlation of PN-codes between adjacent TDL outputs. Regarding the effective input signal resolution of (A) bits, it is typically equal to the signal resolution at the output of the A/D converter.

For each advanced/delayed input sample, the FIR filter requires a corresponding weight from weight generator 16. In a symmetric two-sided ATF, in which for every delayed sample $X_{i-kd}$ there is a corresponding advanced sample $X_{i+kd}$, the optimal weights $W_k$, $W_{-k}$ are equal for any interference waveform. Therefore, only four weights are needed for an 8-tap symmetric ATF. Regarding the weight generator/FIR filter interface, the effective weight resolution of (C) bits is the lower resolution between the resolution of the weight-generator output and the FIR filter. To accommodate transient weight excursions above the reference unit weight, one extension bit is provided, resulting in an (1+C)-bit FIR filter weight of maximum value (2). Each weight $W_k$ is multiplied with the advanced sample $X_{i+kd}$ and the delayed sample $X_{i-kd}$ in the corresponding stages of the digital combiner 21, and the products are added to form the signal $\hat{X}_i$ in FIG. 6. This signal represents the estimate of the interference component in the present sample $\hat{X}_i$ to obtain the ATF output $Y_i = X_i - \hat{X}_i$ at the adder 25. The $D_1$-cycle delay 24 aligns the present sample $X_i$ with the interference estimate $\hat{X}_i$; therefore, it is equal to the number of sampling intervals from the time the input samples $X_{i-4d}$, ..., $X_{i+4d}$ are valid, to the time that $\hat{X}_i$ is available. Similarly, the delay $D_0$ of the ATF output relative to the present sample includes the delay $D_1$ plus the delay due to the adder 25. The signal processing delays, $D_1$, $D_0$ depend on the implementation of the digital ATF. The ATF output bit resolution of B-bits, shown in FIG. 6, corresponds to the maximum resolution of the FIR filter; lower resolution signals may be extracted from the ATF output for upconversion and weight generation.

Figure 7:
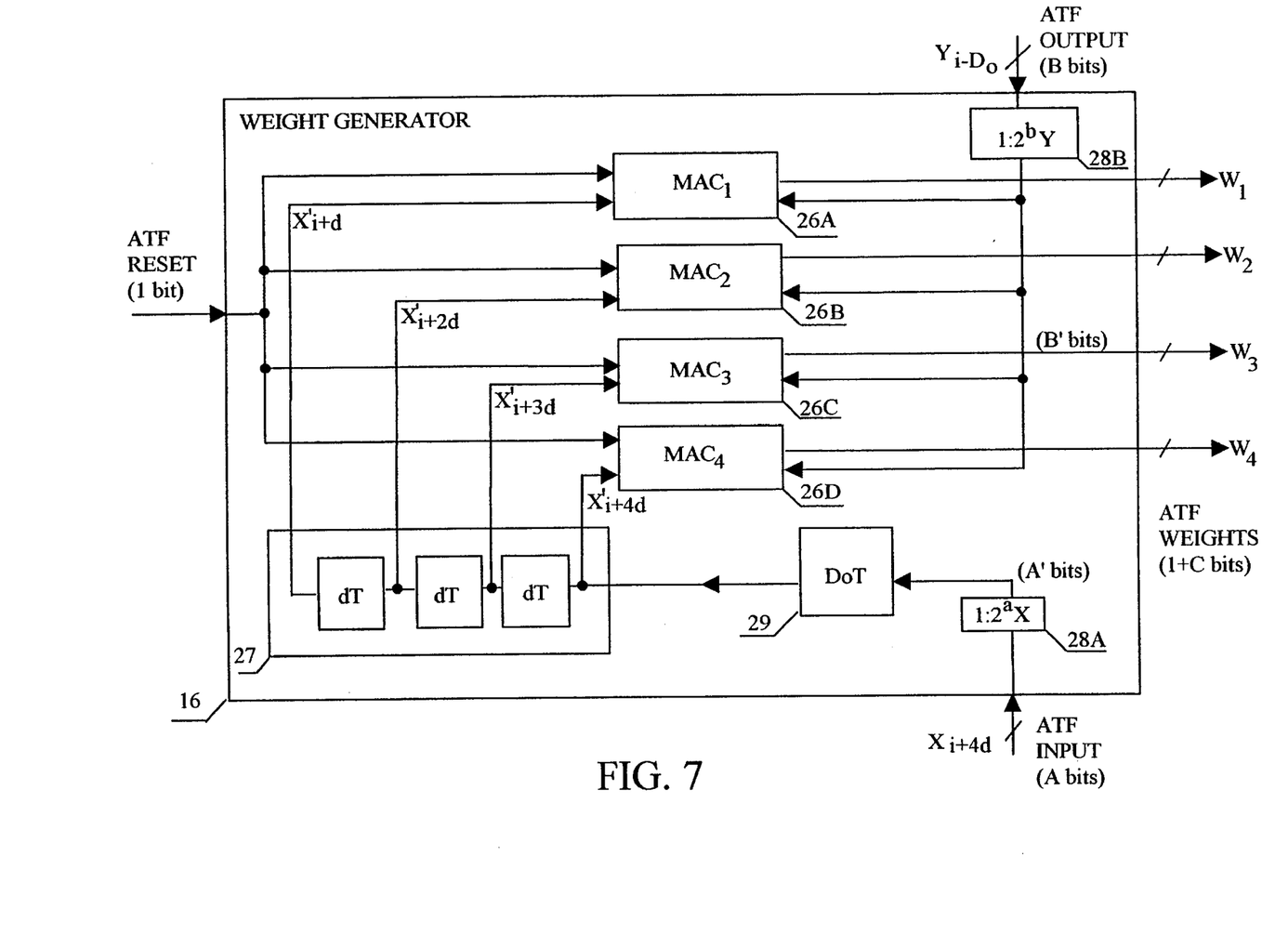
FIG. 7 is a block diagram of the weight generator of the digital ATF of FIG. 5.

The implementation of the digital weight generator 16 is shown in FIG. 7. The weight generator consists off our multiply/accumulate (MAC) sections 26A–26D. Each one of the $MAC_k$ sections, where k=1, 2, 3, 4, has three inputs: (1) a scaled and time-aligned input signal denoted as $X'_{i+kd}$, (2) a scaled feedback signal denoted as $Y'_i$, and (3) a control signal denoted as RESET. The output of $MAC_k$ is the ATF weight $W_k$, which is provided to the FIR filter 15. The input signals $X'_{i+kd}$ are obtained at the k-tap of TDL 27, which is driven by a delayed and scaled version $X'_n$ of the digital ATF input $X_n$. The purpose of the attenuation by $(2^a)$ introduced by the divider 28A is to implement part of the step-size (u) of the Widrow-Hoff adaptive algorithm. The purpose of the delay 29 is to align the input signal to the TDL 27 with the ATF output signal Y. The introduced delay of $D_0$ (sampling) cycles is equal to the processing delay of the FIR filter.

The feedback signal $Y'_i$ is the output of the divider 28B, which attenuates the ATF output $Y_{i-D_0}$ by the factor $(2^b)$. The effective step-size (u) of the Widrow-Hoff algorithm, as implemented by the dividers 28A and 28B, is $u = 2^{-c}$, $c = a + b$. The apportionment of the step-size exponent (c) between the input and feedback signals $(X'_n, Y'_n)$ is an important design issue because it affects the corresponding bit resolutions (A', B'). We have determined that loss of resolution in the feedback signal can cause significant loss in ATF performance, i.e. reduced suppression of interference. This can be avoided if the resolution of the MAC input is sufficiently higher than the resolution of the feedback signal. In the preferred embodiment, in which the ATF was implemented with a field programmable gate array (FPGA) device, we have 10-bit resolution in the feedback signal and 17-bit resolution in the MAC input; therefore, attenuation at 28B by a factor of up to $2^7$ retains the same effective resolution in the signals $Y'_n$ and $Y_n$. A suitable FPGA is the Xilinx XC 4010D.

Normally, $MAC_k$ updates the ATF weight $W_k$ by adding the product of the input signals to the old value of the weight, that is, $W_k=OLD(W_k)+Y'_i \cdot X'_{i+kd}$. For first-time use, OLD $(W_k)$ is zero. When the RESET control is activated, the accumulation operation of $MAC_k$ is disabled resulting in $W_k=Y'_i \cdot X'_{i+kd}$. Since the maximum value of the product is equal to the step-size $u=2^{-7}$, the activation of RESET effectively resets the ATF weights to almost zero values and thereby reconvenes the ATF adaptation process. RESET pulses lasting one sampling cycle are generated periodically by the reset generator 14, which is shown in FIG. 5. This is accomplished by counting sampling cycles through the 20-bit counter of the reset generator, activating the RESET signal when the edge detector determines that the counter has reached the all-zero state, and deactivating the RESET signal one clock cycle later. The above means provides a simple way to combat weight drifting in the digital ATF for GPS applications at the expense of a small SNR loss about $(1-T_{CON}/T_{RES})^2$, in which $T_{CON}$ is the convergence time of ATF (varies widely from $10^2$ to $10^4$ sampling cycles for the above step-size, depending on the type of interference) and $T_{RES}$ is the resetting period (about $10^6$ sampling cycles for the above step-size). The above approach can be extended to include means to detect weight drifting, and to reset or otherwise compensate the weights as needed, instead of doing so periodically.

As shown in FIG. 5, the digital ATF generates a multibit digital output signal $Y_{n-D}$, which is subjected to amplitude regulation and D/A conversion in the D/A interface module 17 to obtain the baseband analog output $Y(t-DT)$ (T denotes one sampling interval). Provision of a multibit digital output signal is necessary in order to avoid SNR loss at the receiver due to limited resolution. Amplitude regulation of the ATF output is necessary in order to avoid receiver distortions due to (i) ATF transients at every ATF resetting, and (ii) variations in ATF output due to different types of interference. Amplitude regulation of the ATF output can be implemented digitally, prior to the D/A conversion, by varying the bit-field of the digital signal delivered to the D/A converter so that the most-significant-bit (MSB) is inactive. Using two's complement arithmetic, MSB is compared to the sign-bit (SB) at every sampling cycle and an accumulator increases when MSB≠SB. If the accumulator registers 1 to 10 counts in $2^8=256$ sampling cycles the bit range stays the same; if the accumulator registers more than 10 counts, the bit-range shifts right by one bit, i.e., MSB=OLD(MSB)+1; if the accumulator registers zero count, the bit range shifts left by one bit, i.e., MSB=OLD(MSB)−1. Six bits (sign-bit plus five consecutive magnitude bits) are delivered to the D/A converter out of the sixteen bits available at the digital ATF output. The above rule for MSB selection ensures that the ±2 σ amplitude range of the analog output signal $Y(t)$ is set at one-half of the amplitude range of the D/A converter, if $Y(t)$ is distributed similar to thermal noise, and that $Y(t)$ has an effective resolution of 5 bits. A suitable D/A converter is the Analog Devices AD561. Amplitude regulation of the ATF output can be also implemented through analog circuits, after the D/A conversion, by applying AGC to the baseband analog output signal at the upconverter.

The digital ATF generates a 1-bit interference indicator signal INTERF in the interference detector module 18, which is shown in FIG. 5. INTERF is enabled if any magnitude bit of the weights W1, W2, W3, W4 which is higher than $2^{-3}$ is enabled. A magnitude bit of a weight is enabled if it is high in sign/magnitude arithmetic, or if it is opposite to the sign-bit in 2's complement arithmetic.

The foregoing description of the architecture of particular embodiments of a spread spectrum interference canceller according to the invention is intended as illustrative of, and not as limiting of, the scope of the invention, which in its essential form comprises a first circuit section for downconverting a received spread spectrum signal from an RF carrier frequency to a baseband intermediate frequency which is less than 10% of the system bandwidth, and which differs from the intermediate frequency of the receiver by twice the maximum expected Doppler frequency; a second section wherein digital processing elements perform finite impulse response filtering of the baseband spread spectrum signal using variable weights; and a third section for upconverting the filtered baseband signal to the RF carrier frequency of the received spread spectrum signal. The invention being thus disclosed, variations and modifications of a spread spectrum interference canceller according to the invention, or sections thereof, will occur to those skilled in the art, and are intended to be within the scope and spirit of the invention, as defined by the following claims:

What is claimed is:

1. A spread spectrum interference canceller for receiving from an antenna an RF analog input signal comprising (i) multiple direct-sequence spread spectrum signals, and (ii) additive multiple narrowband interferers, and for providing to a spread spectrum receiver an RF analog output signal comprising (i) multiple direct-sequence spread spectrum signals, and (ii) a reduced amount of narrowband interference compared to the interference in the RF analog input signal, said interference canceller comprising a downconverter, responsive to said RF analog input signal, for translating the carrier frequency of said RF analog input signal from RF to a baseband intermediate frequency, and for amplifying and regulating the amplitude of said RF analog input signal and thereby generating a baseband analog input signal, a digital adaptive transversal filter, responsive to said baseband analog input signal, for digitizing said baseband analog input signal and thereby generating a baseband digital input signal, for generating a set of digital weight coefficients, for processing said baseband digital input signal through a transversal filter employing said digital weight coefficients to reduce the amount of narrowband interference and thereby generating a baseband digital output signal, and for converting to analog form said baseband digital output signal and thereby generating a baseband analog output signal, and an upconverter, responsive to said baseband analog output signal, for translating the carrier frequency of said baseband analog output signal from a baseband intermediate frequency to the RF frequency of said RF analog input signal, and thereby generating said RF analog output signal.

2. A spread spectrum interference canceller, according to claim 1, wherein said downconverter is further characterized in that said baseband intermediate frequency is (i) higher than the maximum Doppler frequency of said spread spectrum receiver, (ii) a fraction of the pseudorandom noise code rate of said spread spectrum receiver, and (iii) differs from the baseband intermediate frequency of said spread spectrum receiver by more than twice the maximum Doppler frequency of said spread spectrum receiver, means for regulating said RF analog input signal through automatic gain control and generating said baseband analog input signal, whose peak-to-peak amplitude does not exceed the amplitude range of the analog-to-digital converter, and means for amplifying said RF analog input signal by incurring signal-to-noise ratio loss corresponding to a noise figure which is less than the noise figure of said spread spectrum receiver, and which does not exceed 3 dB.

3. A spread spectrum interference canceller, according to claim 1, wherein the digital adaptive transversal filter further comprises an analog-to-digital interface, digitizing said baseband analog input signal, and thereby generating said baseband digital input signal, a digital finite impulse response filter, responsive to said baseband digital input signal, using a set of variable digital weight coefficients to suppress the narrowband interference in said baseband digital input signal, and thereby generating said baseband digital output signal, a digital weight generator, responsive to said baseband digital input and baseband digital output signals, for updating said digital weight coefficients, a reset generator, periodically resetting digital weight coefficients to zero initial values to control weight drifting, a digital-to-analog interface, regulating said baseband digital output signal and converting it to said analog baseband output signal, and an interference detector, generating a signal indicating presence of narrowband interference in said baseband digital input signal.

4. A digital adaptive transversal filter, according to claim 3, wherein the analog-to-digital interface further comprises:

means for generating input samples sampling said baseband analog input signal at a rate exceeding the pseudorandom code noise rate of said spread spectrum receiver by a factor of two or more, and means for digitizing said input samples and thereby generating said baseband digital input signal.

5. A digital adaptive transversal filter, according to claim 3, wherein the digital finite impulse response filter further comprises a memory, storing 2•N•d consecutive samples of said baseband digital input signal, and providing
(i) a reference sample delayed by N•d sampling intervals from the most recent sample, (ii) N delayed samples occurring prior to said reference sample and spaced d sampling intervals apart, and (iii) N advanced samples occurring after said reference sample and spaced d sampling intervals apart, a combiner, using a set of N variable weight coefficients to generate a weighted sum of said N delayed samples and a weighted sum of said N advanced samples, subtracting said weighted sum from said reference sample, and thereby generating said baseband digital output signal, and means for providing symmetric weighting of said delayed and advanced samples, so that if one of the delayed samples and one of the advanced samples are delayed equally from said reference sample, they are weighted equally.

6. A digital adaptive transversal filter, according to claim 3, herein the digital weight generator further comprises means for updating each weight coefficient by adding to the most recent value of said weight coefficient a corresponding weight-increment, which depends on the baseband digital input signal and the baseband digital output signal, means for generating said weight increment by multiplying an attenuated output sample by an attenuated input sample whose relative delay is equal to the relative delay between the input sample corresponding to said weight coefficient in the finite impulse response filter, and said reference sample of the finite impulse response filter, and means for apportioning the amplitude attenuations of the input and output samples so that the total amplitude attenuation corresponds to about seven bits.

7. A digital adaptive transversal filter, according to claim 3, wherein the reset generator further comprises a pulse generator, generating periodically a reset pulse having a width of a few sampling intervals, and means for suppressing the accumulation of weight coefficient values in the digital weight generator means, thereby effecting reinitialization of the weight coefficients.

8. A digital adaptive transversal filter, according to claim 3, wherein the digital-to-analog interface further comprises means for receiving said baseband digital output signal and generating a regulated baseband digital output signal, which contains fewer bits than the baseband digital output signal, which has the same sign-bit as the baseband digital output signal, which has a most-significant-bit equal to a selected magnitude bit of the baseband digital output signal, and which has all subsequent magnitude bits equal to the corresponding bits of the baseband digital output signal following the selected magnitude bit, means for varying the selected magnitude bit depending on the rate at which it is enabled in said baseband digital output signal, and a digital-to-analog converter, converting said regulated baseband digital output signal to said baseband analog output signal, and providing that signal to said upconverter means.

9. A digital adaptive transversal filter, according to claim 3, wherein the interference detector further comprises means for receiving from each one of said weight coefficients, a group of successive magnitude bits, which starts from the most-significant-bits, and which contains a fixed number of bits, means for performing a detection operation for each one of said weight coefficients, detecting if any bit in the corresponding group of successive magnitude bits is enabled, and means for enabling an indicator signal if any one of said detection operations is positive.

10. A spread spectrum interference canceller, according to claim 1, wherein the upconverter further comprises means for regulating said baseband analog output signal through automatic gain control, means for translating the carrier frequency of said baseband analog output signal from said baseband intermediate frequency to the RF frequency of said RF analog input signal, and thereby generating said RF analog output signal, means for attenuating said baseband analog output signal by a fixed attenuation so that, under interference-free conditions, the power level of said RF analog output signal at the spread spectrum receiver input is no less than 10 dB above the power of said RF analog input signal at the receiver input if the interference canceller is absent, and means for providing said RF analog output signal to the spread spectrum receiver.

* * * * *

UNITED STATES PATENT AND TRADEMARK OFFICE
CERTIFICATE OF CORRECTION

PATENT NO. : 5,596,600
DATED : January 21, 1997
INVENTOR(S) : George Dimos, et al It is certified that error appears in the above-indentified patent and that said Letters Patent is hereby corrected as shown below:

Col. 4, line 25, the heading "Description of the Preferred Embodiments" should be --   Description of the Drawings--; and on line 45, the heading "Description of Preferred Embodiment" should be --Description of the Preferred Embodiment--.

Col. 8, at the end of line 45, "off our" should be --of four--.

Col. 10, between lines 30 and 31, insert --CLAIMS--.

Claim 4, Col. 11, line 44, after "samples" but before "sampling", insert --by--.

Signed and Sealed this

Sixteenth Day of September, 1997

Attest:

BRUCE LEHMAN

Attesting Officer    Commissioner of Patents and Trademarks